(12) United States Patent
Howell et al.

(10) Patent No.: US 12,326,220 B2
(45) Date of Patent: *Jun. 10, 2025

(54) LOW-PROFILE MODULAR POSITIONING COUPLER

(71) Applicant: Freedom Surveillance, LLC, Scottsdale, AZ (US)

(72) Inventors: Mark J. Howell, Phoenix, AZ (US); Darin C. Lewandowski, Phoenix, AZ (US)

(73) Assignee: FREEDOM SURVEILLANCE, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,239

(22) Filed: Apr. 15, 2024

(65) Prior Publication Data

US 2024/0369181 A1 Nov. 7, 2024

Related U.S. Application Data

(63) Continuation of application No. 17/895,133, filed on Aug. 25, 2022, now Pat. No. 11,988,326.

(60) Provisional application No. 63/237,863, filed on Aug. 27, 2021.

(51) Int. Cl.
| | | |
|---|---|---|
| H04N 7/18 | (2006.01) | |
| F16M 11/04 | (2006.01) | |
| F16M 11/08 | (2006.01) | |
| F16M 11/20 | (2006.01) | |
| F16M 13/02 | (2006.01) | |

(52) U.S. Cl.
CPC ........ *F16M 13/022* (2013.01); *F16M 11/041* (2013.01); *F16M 11/08* (2013.01); *F16M 11/2014* (2013.01)

(58) Field of Classification Search
CPC .... F16M 13/022; F16M 11/041; F16M 11/08; F16M 11/2014; F16M 11/16; F16M 11/18; F16M 11/28; F16M 13/02; F16M 11/42; B60R 2011/004; B60R 11/04
See application file for complete search history.

(56) References Cited

U.S. PATENT DOCUMENTS

| | | |
|---|---|---|
| 5,611,177 A | 3/1997 | Herbstritt |
| 5,743,635 A | 4/1998 | Hulse et al. |
| 6,517,225 B1 | 2/2003 | Allen et al. |

(Continued)

OTHER PUBLICATIONS

Strongwatch Freedom on the Move Functional Overview, Freedom Surveillance, LLC, 14 pages, 2018.

*Primary Examiner* — Amy J. Sterling
(74) *Attorney, Agent, or Firm* — Panitch Schwarze Belisario & Nadel LLP

(57) ABSTRACT

A modular coupler coaxially mountable with a mast includes a first plate, a second plate and a column axially extending between the first and second plates. An arm is rotatably attached to the column and generally transversely extends therefrom and beyond a radial extent of the first plate and of the second plate. A mounting bracket projects from the arm along a portion of the arm outside the radial extent of the first plate and of the second plate. The mounting bracket is configured to removably mount a first surveillance equipment thereto. A motor is mounted to the arm outside the radial extent of the first plate and of the second plate and is configured to rotate the arm about the column.

20 Claims, 7 Drawing Sheets

(56) References Cited

U.S. PATENT DOCUMENTS

| | | | |
|---|---|---|---|
| 7,484,858 B2 | 2/2009 | Deighton et al. | |
| 7,989,979 B2 | 8/2011 | Burgess et al. | |
| 8,910,432 B2 | 12/2014 | Egan et al. | |
| 9,182,070 B2 | 11/2015 | Shannahan et al. | |
| 9,598,875 B1 | 3/2017 | Bateman et al. | |
| 9,743,754 B2 * | 8/2017 | Ergun | A47B 9/12 |
| 10,294,688 B2 | 5/2019 | Gorney et al. | |
| 10,959,514 B2 * | 3/2021 | Klinke | A47B 9/00 |
| 11,059,431 B2 | 7/2021 | Day et al. | |
| 2012/0312196 A1 * | 12/2012 | Newkirk | H02J 7/00045 108/50.02 |
| 2015/0042811 A1 | 2/2015 | Avignon et al. | |

\* cited by examiner

LOW-PROFILE MODULAR POSITIONING COUPLER

CROSS-REFERENCE TO RELATED APPLICATION

This application is a continuation of similarly-titled, co-pending U.S. patent application Ser. No. 17/895,1331, filed on Aug. 25, 2022, which claims priority from similarly-titled U.S. Provisional Patent Application No. 63/237,863, filed Aug. 27, 2021, the entire contents of each of which are incorporated by reference herein in their entireties.

BACKGROUND OF THE DISCLOSURE

The disclosure generally relates to surveillance systems, and more particularly, to a low-profile, modular positioning coupler configured for use with surveillance systems.

Surveillance systems are well-known in the art. One example of such a system is the Freedom-On-The-Move ("FOTM 3.0"), which is a commercially available retractable, vehicle-mounted surveillance system sold by Freedom Surveillance, LLC dba STRONGWATCH®, Scottsdale, Ariz. As shown in FIGS. 1A and 1B, the conventional surveillance system 5 is mounted to a bed 3 of a truck 1. Generally, the system 5 includes a movable, e.g., pneumatically, retractable telescoping structure 6 having a first surveillance equipment 7, e.g., without limitation, a camera, radar, laser for target designation or range determination, sensor(s), or other payload, removably mounted thereon. In a fully extended, upright, i.e., operational, position (FIG. 1A), the first retractable telescoping structure 6 effectively functions as a mast and the first surveillance equipment 7 is mounted at or near a top portion of the mast 6. In a retracted/stowed state, as shown in FIG. 1B, the system 5 fits entirely within the bed 3 of the truck 1 so that it can be completely hidden and protected from the elements using a covering 2.

In addition to the first surveillance equipment 7, additional surveillance equipment may be beneficial. Additional surveillance equipment may include a camera, radar, sensor(s), flood light, loud hailer, another payload, or a combination thereof. Similarly to the first surveillance equipment 7, it is desirable for the additional surveillance equipment to be retractable when not in use, e.g., to be hidden from view and protected from the elements, and which can be deployed during use. One drawback of conventional mobile surveillance systems is that a second retractable structure (not shown), operating as a second mast, is employed, to mount the additional surveillance equipment thereof. Alternatively, in some systems, a cross-bar (not-shown) is mounted to the first retractable telescoping structure 6, and both the first surveillance equipment 7 and the additional surveillance equipment are mounted side-by-side along the cross-bar.

Both of such approaches result in a much larger system, that is heavier, more expensive, and more cumbersome to manufacture and operate. Additionally, such systems result in operational deficiencies. For example, in the cross-bar formation, the surveillance devices may interfere with the line of sight/field of regard of one another. Additionally, any surveillance devices that are offset from the central axis of the telescoping structure 6 when mounted create a bending force on the telescoping structure 6, thereby subjecting the telescoping structure 6 to unnecessary forces which may interfere with mobility of the system and/or otherwise amplify the risk of telescoping structure 6 failure.

It would, therefore, be advantageous to manufacture a modular, low-profile, positioning coupler mountable coaxially with the retractable, telescoping structure for mounting of additional equipment surveillance thereto.

BRIEF SUMMARY OF THE DISCLOSURE

Briefly stated, one aspect of the present disclosure is directed to a modular coupler coaxially mountable with a mast. The modular coupler includes a first plate, a second plate and a column axially extending between the first and second plates. An arm is rotatably attached to the column and generally transversely extends therefrom and beyond a radial extent of the first plate and of the second plate. A mounting bracket projects from the arm along a portion of the arm outside the radial extent of the first plate and of the second plate. The mounting bracket is configured to removably mount a first surveillance equipment thereto. A motor is mounted to the arm outside the radial extent of the first plate and of the second plate and is configured to rotate the arm about the column.

Another aspect of the present disclosure is directed to a modular coupler coaxially mountable with a mast. The modular coupler includes a spool-shaped frame having a first plate, a second plate, and a column axially extending between the first and second plates. An arm is rotatably attached to the column and generally transversely extends therefrom and beyond a radial extent of the first plate and of the second plate. A mounting bracket projects from the arm along a portion of the arm outside the radial extent of the first plate and of the second plate. The mounting bracket is oriented substantially parallel with the column and is configured to removably mount a first surveillance equipment thereto. A motor is mounted to the arm outside the radial extent of the first plate and of the second plate and is configured to rotate the arm about the column. A stationary toothed pulley is fixedly mounted about the column and a rotatable drive pulley, operatively connected to the motor, is positioned outside the radial extent of the first plate and of the second plate. A toothed belt extends between the rotatable drive pulley and the stationary toothed pulley. The second plate is configured to mate with a base mounting plate of a second surveillance equipment, the second plate including a clamp configured to removably engage the base mounting plate of the second surveillance equipment in a tool-free manner, whereby the second surveillance equipment is coaxially mountable upon the coupler.

BRIEF DESCRIPTION OF THE SEVERAL VIEWS OF THE DRAWINGS

The following description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1A:
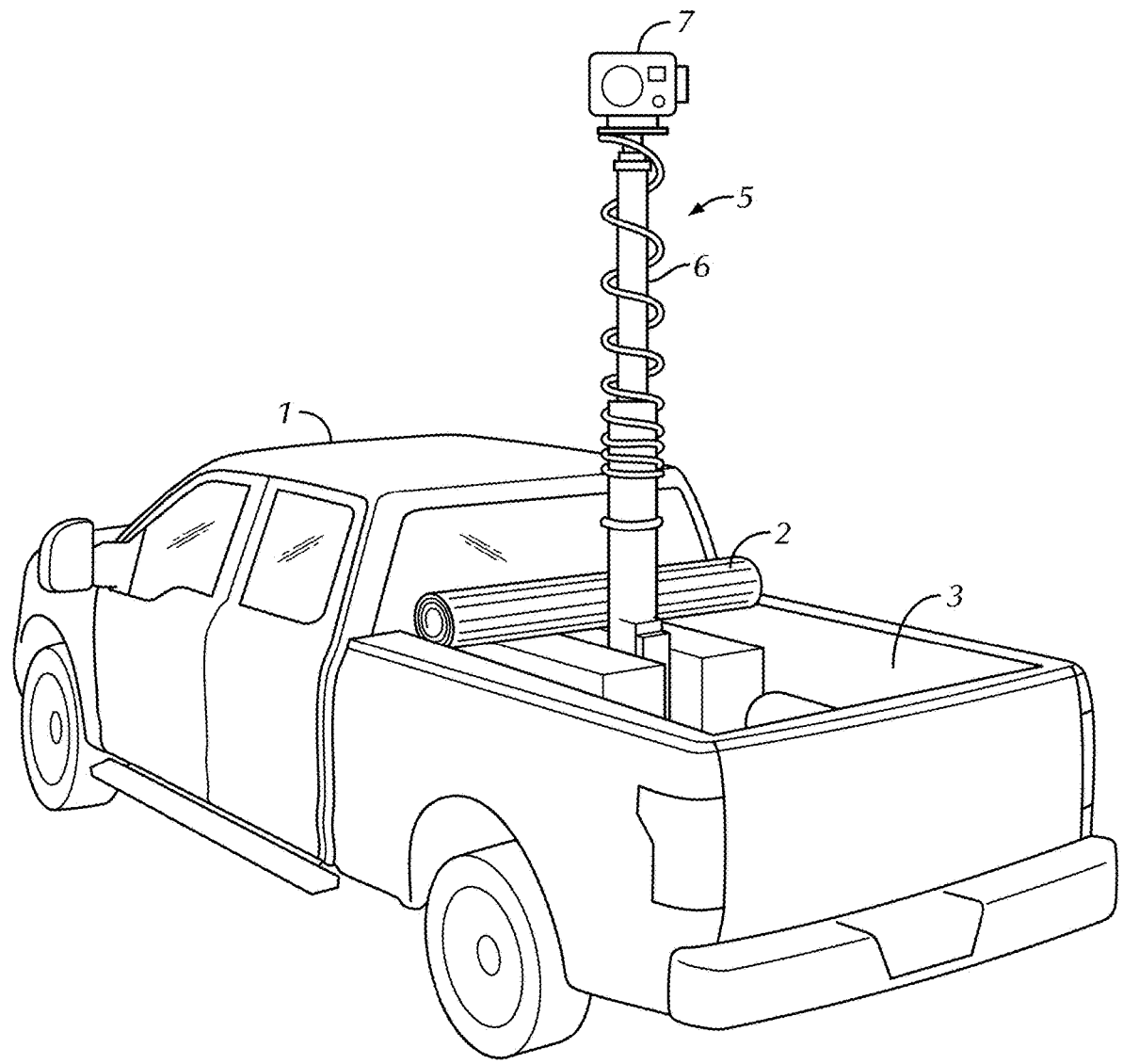
FIG. 1A is a perspective view of a conventional mobile surveillance system in an operational state.
Figure 1B:
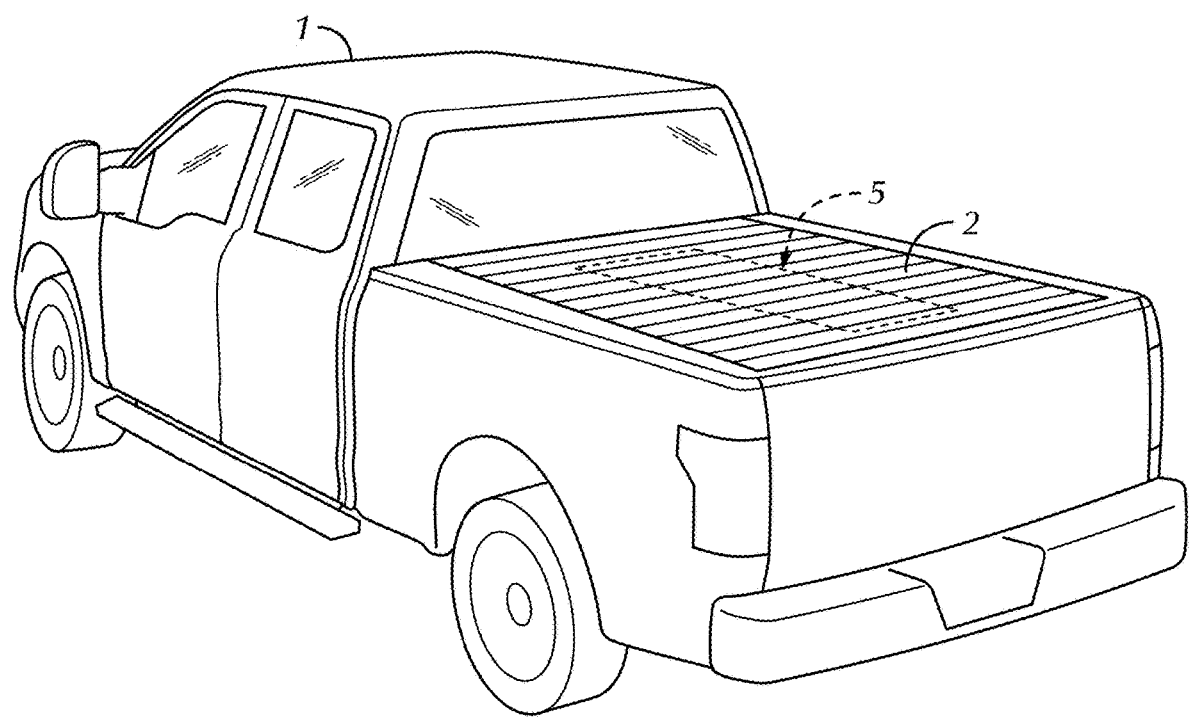
FIG. 1B is a perspective view of the conventional mobile surveillance system of FIG. 1A in a stowed away state.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the positioning coupler, and designated parts thereof, in accordance with the present disclosure. In describing the positioning coupler, the term proximal is used in relation to the upper end of the device and the term distal is used in relation to the bottom end of the device. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 2-6, a positioning coupler, generally designated 10, in accordance with an embodiment of the present disclosure for mounting to a retractable, telescoping structure 6, e.g., a retractable telescoping structure of the surveillance system 5, as described in further detail below.

In the illustrated embodiment, the positioning coupler 10 takes the form of a spool-shaped coupler. That is, the positioning coupler 10 includes a bottom (first) plate 14 and a top (second) plate 12. As shown best in FIG. 3, the bottom plate 14 includes a first, upwardly projecting throat 14a, i.e., in a direction toward the top plate 12, and the top plate 12 includes a second, downwardly projecting throat 12a, i.e., in a direction toward the bottom plate 14. The first and second throats 14a, 12a are configured to fixedly engage one another to form a continuous column 16 extending between the top and bottom plates 12, 14. In the illustrated embodiment, the second throat 12a is at least partially received within the first throat 14a, but the disclosure is not so limited. For example, the first throat 14a may alternatively be received with the within the second throat 12a. Further alternatively, the first and second throats 14a, 12a, may be otherwise fastened to one another, e.g., without limitation, via engaging faces at the respective terminal ends thereof, to form the continuous column 16. Yet further alternatively, the column 16 may be formed as a single piece structure projecting from one of the plates 12, 14 and fastened to the other, or fastened to both plates 12, 14.

An arm 18 is rotatably attached to the column 16 (as will be described in further detail below) and transversely extends therefrom. That is, the arm 18 is rotatable about the column 16. In the illustrated embodiment, the arm 18 is oriented generally perpendicularly to the column 16, but the disclosure is not so limited. The length of the arm 18 is greater than the radial extent of the top and bottom plates 12, 14. In the illustrated embodiment a terminal, free end of the arm 18 is defined by a mounting bracket 20. In the illustrated embodiment, the mounting bracket 20 is oriented generally parallel with the column 16, but the disclosure is not so limited. As should be understood, the mounting bracket 20 may also project from the arm 18 along different portions of the length of the arm 18 and at different angles relative to the arm 18. As also should be understood, more than one mounting bracket 20 (of the same or differing sizes) may project from the arm 18 along different portions of the length thereof. As shown, surveillance equipment 22 may be removably mounted to the mounting bracket 20 via any of numerous mounting means currently known or that later become known in the art. For example, the surveillance equipment 22 may be fastened to the mounting bracket 20 via fastening screws, bolts, clamps, a combination thereof or the like. In the illustrated embodiment, the surveillance equipment 22 takes the form of a 3D radar, such as, for example, without limitation the EchoGuard 3D Surveillance Radar sold by Echodyne Corp, but the disclosure is not so limited. Additionally, or alternatively, the surveillance equipment 22 may take the form of other radars, sensor(s), camera(s), flood light(s), loud hailer(s), microphone array(s), another payload, or a combination thereof.

Figure 3:
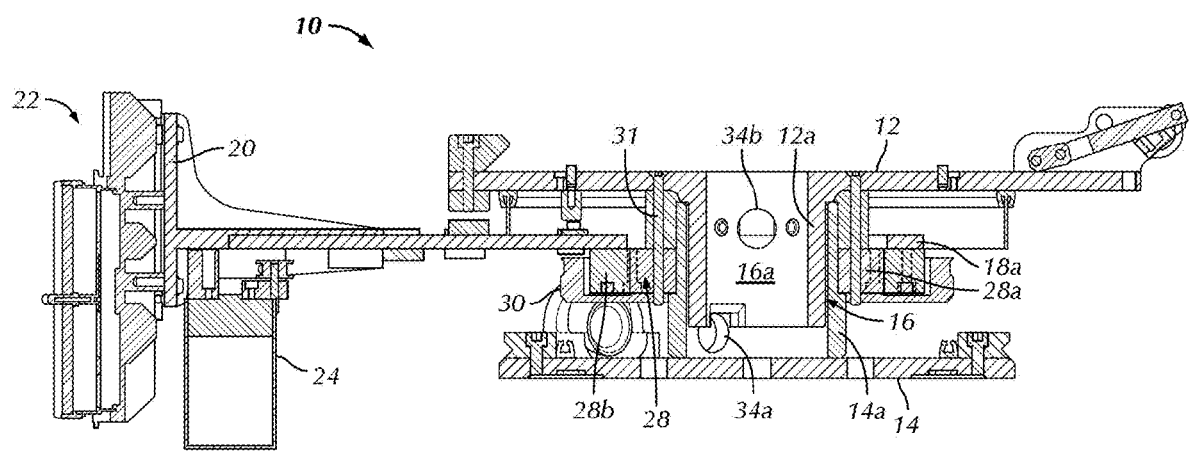
FIG. 3 is a cross-sectional view of the positioning coupler of FIG. 2.

Turning to the column 16, and as shown best in FIG. 3, a bearing 28, e.g., a turntable bearing such as a crossed-roller turntable bearing, is positioned about the column 16, between the top and bottom plates 12, 14. An inner race 28a of the bearing 28 is fixedly, i.e., non-rotatably, mounted relative to the column 16 (as will be described in further detail below). Conversely, an outer race 28b of the bearing 28 is rotatable about the column 16. A leading or proximal end 18a of the arm 18a also encircles the column 16 and is securely attached to the outer race 28b of the bearing 28, thereby enabling the arm 18 to rotate about the column 16 with the outer race 28b.

Figure 2:
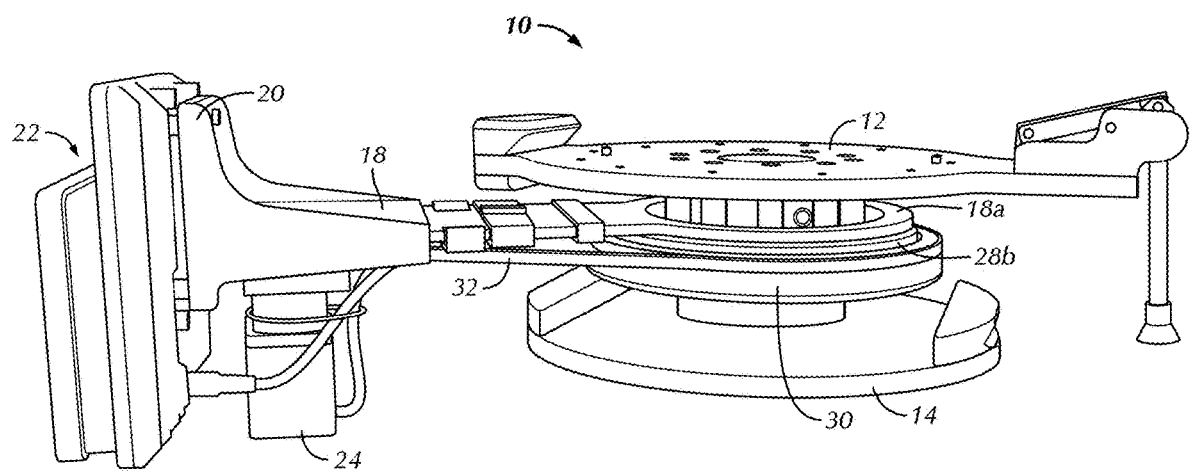
FIG. 2 is an elevational view of a positioning coupler of the present disclosure.

As shown best in FIGS. 2 and 3, a toothed pulley 30 is also mounted between the top and bottom plates 12, 14, and at least partially encircles the bearing 28 without impacting rotation of the outer race 28b thereof. That is the toothed pulley 30 is spaced radially outwardly from outer race 28b. The toothed pulley 30 is also fixedly, i.e., non-rotatably, mounted relative to the column 16. In the illustrated embodiment, and as shown in FIG. 3, at least one standoff 31 is attached to and projects from the top plate 12, through the inner race 28a of the bearing 28 and into attachment with the pulley 30 to rotationally fix the inner race 28a and the pulley 30, but the disclosure is not so limited. That is, the inner race 28a and the pulley 30 may be rotationally fixed relative to column 16 via any of numerous different fastening mechanisms currently known, or that later become known, by those of ordinary skill in the art. At a minimum, the standoff(s) 31 may alternatively be attached to and extend from the inner race 28a of the bearing 28, through the pulley 30 and into attachment with the bottom plate 14. The standoff(s) 31 also maintains a spacing between the bearing 28 and the pulley 30 relative to the top plate 12 as well as the bottom plate 14.

Figure 4:
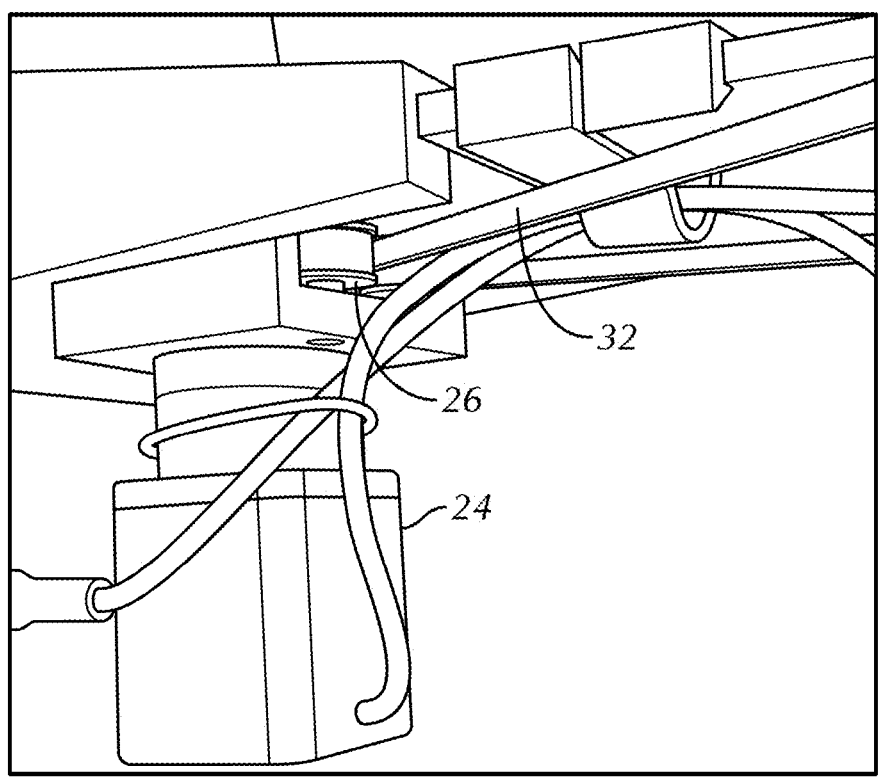
FIG. 4 is an enlarged, partial view of a motor and arm of the positioning coupler of FIG. 2.

As shown best in FIGS. 2 and 4, a motor 24 is mounted to the arm 18. In the illustrated embodiment, the motor 24 is mounted to the underside of the arm 18, but the disclosure is not so limited. That is, for example, without limitation, the motor 24 may alternatively be positioned above the arm 18 or within the arm 18 (depending on the dimensions of the arm 18). As should be understood by those of ordinary skill in the art, the motor 24 is operatively connected to a drive pulley 26 which is rotated/spun by the motor 24 in a manner well understood. In the illustrated embodiment, the motor 24 takes the form of a stepper motor, e.g., a NEMA 17-sized motor made by Sanyo Denki of Japan, but the disclosure is not so limited. For example, without limitation, the motor 24 may take the form of a brushless or brushed DC motor, or the like. Gear reduction and/or position sensing may optionally also be employed. A toothed belt 32 extends between the rotating drive pulley 26 and the stationary, toothed pulley 30. As should be understood, therefore, the teeth of the stationary pulley 30, engaged with the belt 32, prevent the belt 32 from spinning. Rather, in operation, rotation of the drive pulley 26 (via operation of the motor 24) relative to the non-spinning belt 32 rotates the arm 18 (and the outer bearing race 28b) about the column 16. Stated differently, the rotation of the drive pulley 26 pulls itself (and the arm 18) around the column 16.

Advantageously, the motor 24 and the drive pulley 26 are positioned outside the radial extent of the top and bottom plates 12, 14. Accordingly, the size of the motor 24 and the drive pulley 26 does not factor into the required distance between the top and bottom plates 12, 14. This assists in forming a low-profile positioning coupler 10. In one embodiment, the top and bottom plates 12, 14 are only spaced approximately four inches apart, despite the motor 24 and the drive pulley 26 taking up a greater space in the same orientation. Additionally, the surveillance equipment 22 can be substantially larger in the same orientation than the space between the top and bottom plates 12, 14. Further advantageously, the rotational ability of the surveillance equipment 22 (due to the rotational ability of the arm 18) reduces the number of equipment required. For example, panels radars generally scan a region between approximately 90° and approximately 120° without moving the antenna. If the required field of regard is wider than 120°, e.g., 180° or 360°, multiple panels pointed in different directions may be required, which greatly compounds cost as well as weight and sail area aloft, the latter driving a scaling-up of all the supporting equipment (structure and power), perhaps beyond suitability, particularly in cases where an operational requirement is that the entire package of mast and sensors must be stowed in the bed of the truck. Conversely, the positioning coupler 10 reduces the need for duplicative surveillance equipment 22 due to the rotational ability of the arm 18, enabling substantially 360° range.

Figure 5:
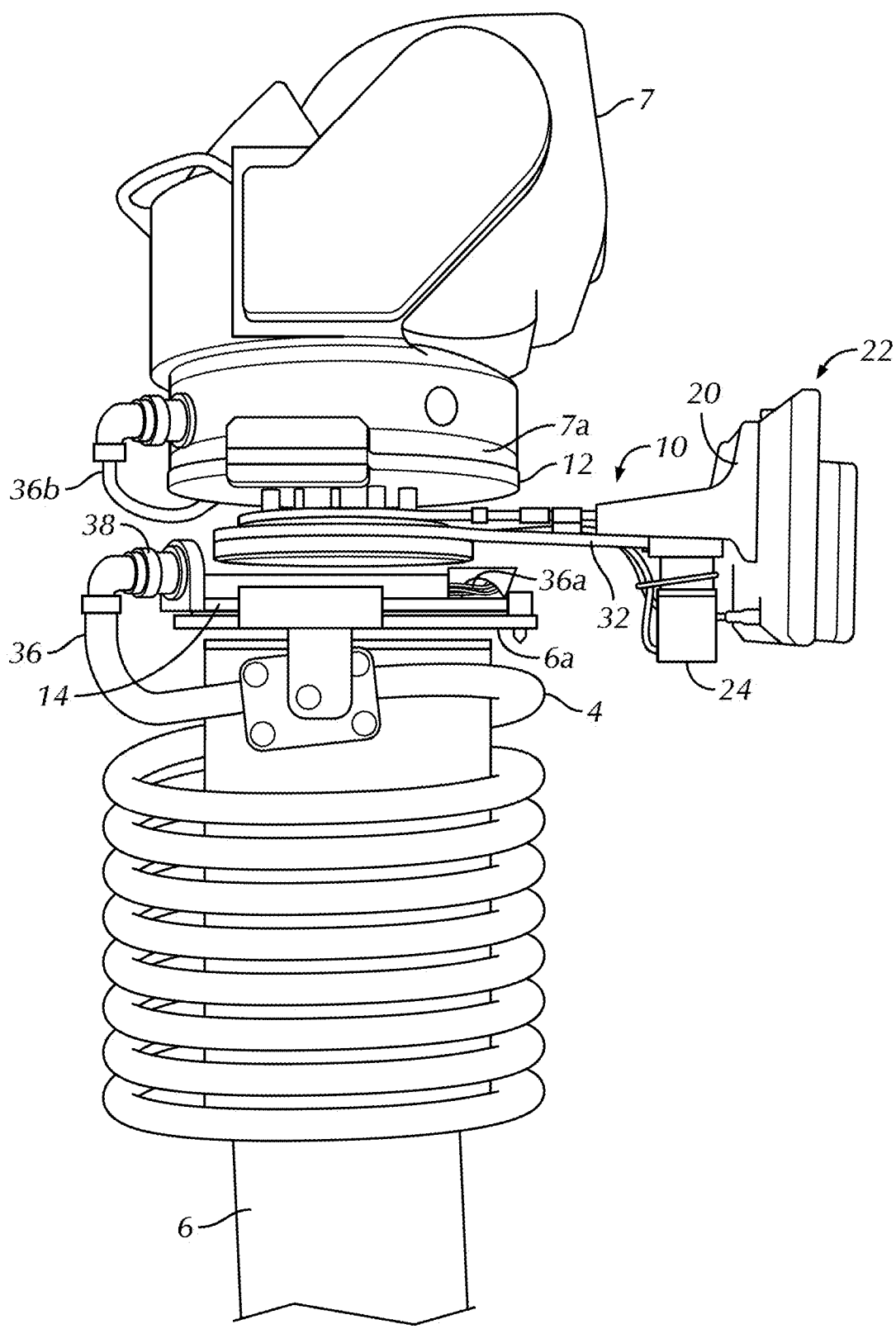
FIG. 5 is an elevational view of the positioning coupler of FIG. 2 mounted to the mobile surveillance system of FIG. 1.
Figure 6:
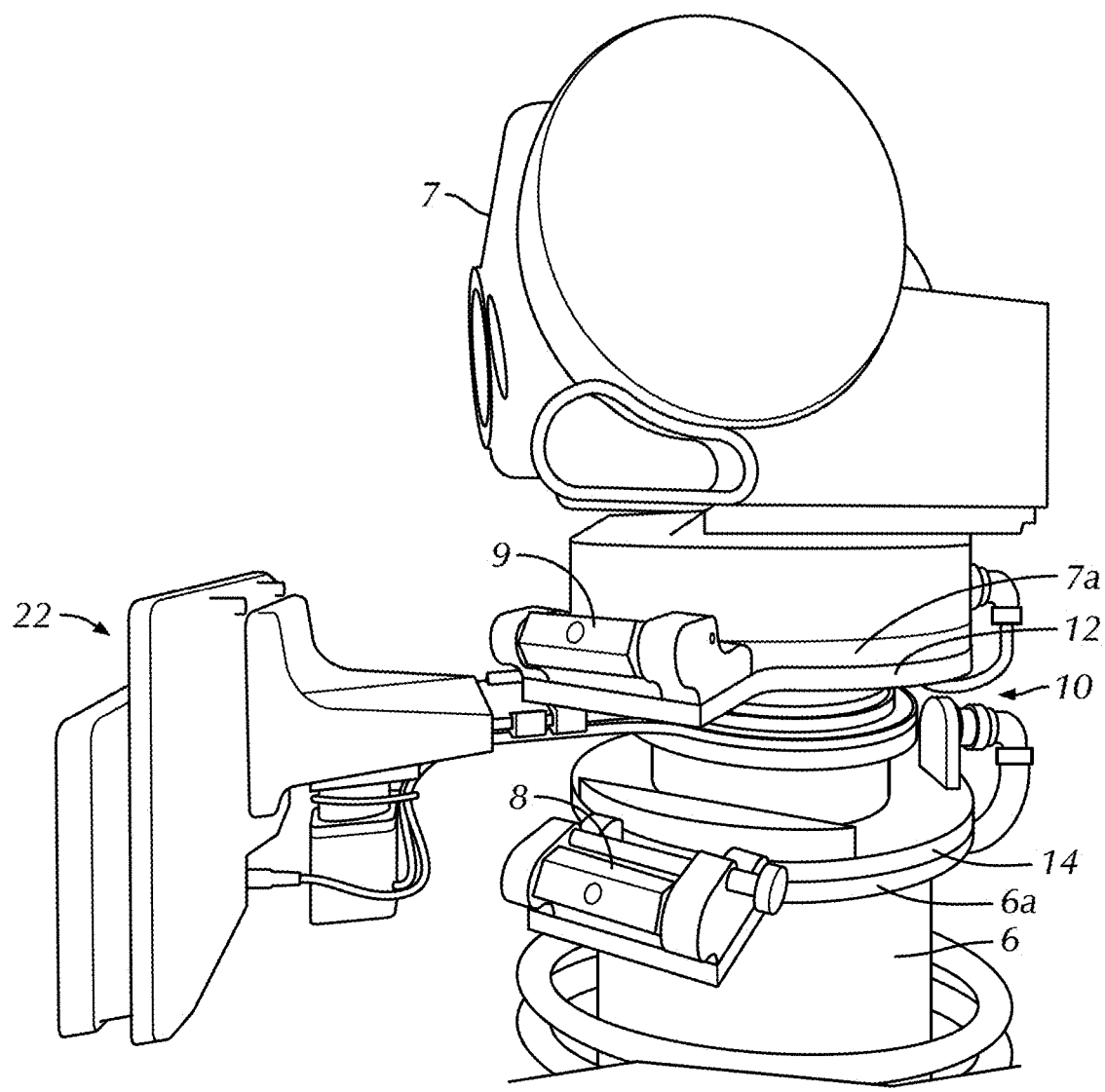
FIG. 6 is a perspective view of the positioning coupler of FIG. 2 mounted to the mobile surveillance system of FIG. 1.

FIGS. 5 and 6 illustrate a non-limiting, exemplary use of the positioning coupler 10 with the system 5, e.g., the FOTM 3.0. As shown in FIG. 5, the positioning coupler 10 is mounted between a terminal, upper end of the retractable telescoping structure 6, i.e., mast, and an underside of the first surveillance equipment 7. In the illustrated embodiment, the positioning coupler 10 is configured to mount with, and between, the mast 6 and the surveillance equipment 7 via the native mounting structure employed on the FOTM 3.0. That is, the terminal end of the mast 6 includes an upper mounting plate 6a configured to removably mount with a base mounting plate 7a of the surveillance equipment 7 via a quick connect/disconnect clamp 8 positioned on the upper mounting plate 6a. The bottom plate 14 of the positioning coupler 10 is, therefore, formed to mate with the upper mounting plate 6a of the mast 6, and receive the clamp 8 (as previously received by the mounting plate 7a) to removably engage the positioning coupler 10 with the mast 6. The surveillance equipment 7 may then be positioned upon the top plate 12 of the positioning coupler 10. The top plate 12 of the positioning coupler 10 is formed to mate with the base mounting plate 7a of the surveillance equipment 7 in like manner as the upper mounting plate 6a of the mast 6. That is, the top plate 12 includes a clamp 9, similar to the clamp 8, to removably engage the base mounting plate 7a of the surveillance equipment 7. Advantageously, utilizing the native mounting structure of the FOTM 3.0 enables plug-and-play use of the positioning coupler 10 with the FOTM 3.0. That is, the system 5 and the surveillance equipment 7 require no additional structural fabrication for use with the positioning coupler 10. As should be understood by those of ordinary skill in the art, however, the positioning coupler 10 may removably mount between the mast 6 and the surveillance equipment 7 via any of numerous different mounting means currently known or that later become known. Similarly, the mounting bracket 20 can be configured with a quick clamp bracket to facilitate the rapid substitution of different surveillance equipment 22 for use with the positioning coupler 10.

Advantageously, the quick clamp mounting structure enables tool free mounting of the positioning coupler 10. Further advantageously, multiple positioning couplers 10 may be stacked and mounted upon one another to add as many additional surveillance equipment 22 as required. Yet further, the low-profile dimension of the positioning coupler 10, e.g., approximately four inches between the plates 12, 14, adds minimal total length increase to the system 5. Accordingly, the system 5 is still retractable into the stowed position to fit within the bed 3 of the truck 1.

Yet further advantageously, because the first surveillance equipment 7 is stacked above the additional surveillance equipment 22 when the positioning coupler 10 is mounted with the system 5 as previously described, both devices 7, 22 have a substantially unobstructed field of regard to the horizon. Moreover, because the positioning coupler 10 is mounted coaxially with the underlying mast 6 and the overlying surveillance equipment 7, the mass of the payload(s) 7, 22 remain largely aligned with the central axis of the mast 6. Such a design results in efficient on-the-move operation. That is, there is reduced torque/bending force on the mast 6, thereby resulting in increased stability and structural integrity of the mast 6 and the overall system 5 during movement of the truck 1, even in cases when the mast 6 is partially or fully deployed during movement of the truck 1.

Turning back to FIG. 3, the column 16 also includes a lower through-hole 34a underlying the bearing 28 and pulley 30 and an upper through hole 34b above the bearing 28 and the pulley 30. The column 16 also defines an internal pathway 16a extending between the through-holes 34a, 34b, thereby enabling communication therebetween. As also shown in FIG. 5, the system 5 includes power and data cables 36 traveling within a coil 4 wrapped around the mast 6. The power and data cables 36 exit the coil 4 proximate the upper mounting plate 6a of the mast 6. The power and data cables 36 are then divided into a first power and data cable set 36a and a second power and data cable set 36b. As shown, the positioning coupler 10 may include a socket 38, e.g., a circular connector such as an MIL-DTL-26482 compliant connector, configured to receive the power and data cables 36, and, thereafter divide into the first power and data cable set 36a and the second power and data cable set 36b. The first power and data cable set 36a is fed underneath the bearing 28 and pulley 30 and into electrical communication with the motor 24 and the surveillance equipment 22. Control and network electronics (not shown) within the positioning coupler 10 may also be in communication between the first power and data cable set 36a and the motor 24 and the surveillance equipment 22. The second power and data cable set 36b is fed underneath the bearing 28 and pulley 30 and into the internal pathway 16a of the column 16 via the lower through-hole 34a. The second power and data cable set 36b is fed through the internal pathway 16a and exits out of the upper through-hole 34b and into electrical communication with the surveillance equipment 7. Advantageously, therefore, the first and second power and data cable sets 36a, 36b do not obstruct the path of rotation of the arm 18. That is, the first power and data cable set 36a does not elevationally overlap with the arm 18, but remains underneath the arm 18, thereby avoiding interference therewith. The second power and data cable set 36a elevationally surpasses the arm 18 within the column 16 and exits from the column 16 beyond the arm 18. Therefore, as shown best in FIG. 5, the second power and data cable set 36a also does not obstruct the path of rotation of the arm 18. In one configuration, the positioning coupler 10 may also include a slip ring (not shown) to provide communication and power transmission with the surveillance equipment 7 and/or 22 while enabling 360° continuous motion of the surveillance equipment 7 and/or 22.

It will be appreciated by those skilled in the art that various modifications and alterations could be made to disclosure above without departing from the broad inventive concepts thereof. Some of these have been discussed above and others will be apparent to those skilled in the art. It is understood, therefore, that this invention is not limited to the particular embodiments disclosed, but it is intended to cover modifications within the spirit and scope of the present disclosure, as set forth in the appended claims.

We claim:

1. An equipment mounting assembly comprising:
   a first plate;
   a column axially extending from the first plate;
   an arm rotatably attached to the column and oriented generally transversely to the column, the arm extending beyond a radial extent of the first plate;
   a mounting bracket projecting from the arm along a portion of the arm outside the radial extent of the first plate, the mounting bracket being configured to removably mount a surveillance equipment thereto; and
   a motor connected to the column, the motor being (i) rotatable about the column, (ii) positioned outside the radial extent of the first plate, and (iii) configured to rotate the arm about the column.

2. The equipment mounting assembly of claim 1, further comprising a second plate, wherein the column axially extends between the first and second plates.

3. The equipment mounting assembly of claim 2, wherein the arm also extends beyond a radial extent of the second plate.

4. The equipment mounting assembly of claim 2, wherein the portion of the arm from which the mounting bracket projects is also positioned outside a radial extent of the second plate.

5. The equipment mounting assembly of claim 2, wherein the motor is also positioned outside a radial extent of the second plate.

6. The equipment mounting assembly of claim 2, wherein the surveillance equipment is a first surveillance equipment, and wherein the second plate is configured to removably mount a second surveillance equipment thereto.

7. The equipment mounting assembly of claim 2, wherein the surveillance equipment is a first surveillance equipment, and wherein the second plate is configured to mate with a base mounting plate of a second surveillance equipment, the second plate including a clamp configured to removably engage the base mounting plate of the second surveillance equipment in a tool-free manner, whereby the second surveillance equipment is coaxially mountable upon the assembly.

8. The equipment mounting assembly of claim 1, further comprising a stationary toothed pulley fixedly mounted about the column, a rotatable drive pulley operatively connected to the motor, and a toothed belt extending between the rotatable drive pulley and the stationary toothed pulley.

9. The equipment mounting assembly of claim 8, wherein the drive pulley is positioned outside the radial extent of the first plate.

10. The equipment mounting assembly of claim 1, further comprising a bearing positioned about the column and having an inner race fixedly mounted relative to the column and an outer race rotatably mounted relative to the column, wherein a leading end of the arm is securely attached to the outer race.

11. The equipment mounting assembly of claim 10, wherein the column includes a first through-hole axially underlying the bearing, a second through-hole axially overlying the bearing and an internal pathway within the column and extending between the first and second through-holes.

12. The equipment mounting assembly of claim 1, further comprising the surveillance equipment, wherein the surveillance equipment comprises at least one of a radar, a sensor, a camera, a flood light, a loud hailer, a microphone array, a laser, or another surveillance payload.

13. An equipment mounting assembly comprising:
   a first plate;
   a second plate;
   a column axially extending between the first and second plates;
   an arm rotatably attached to the column and oriented generally transversely to the column, the arm extending beyond a radial extent of the first plate and of the second plate;
   a mounting bracket projecting from the arm along a portion of the arm outside the radial extent of the first plate and of the second plate, the mounting bracket being configured to removably mount a surveillance equipment thereto; and
   a motor connected to the column, the motor being (i) rotatable about the column, (ii) positioned outside the radial extent of the first plate and of the second plate, and (iii) configured to rotate the arm about the column.

14. The equipment mounting assembly of claim 13, further comprising a stationary toothed pulley fixedly mounted about the column, a rotatable drive pulley operatively connected to the motor, and a toothed belt extending between the rotatable drive pulley and the stationary toothed pulley.

15. The equipment mounting assembly of claim 14, wherein the drive pulley is positioned outside the radial extent of the first plate.

16. The equipment mounting assembly of claim 13, further comprising a bearing positioned about the column and having an inner race fixedly mounted relative to the column and an outer race rotatably mounted relative to the column, wherein a leading end of the arm is securely attached to the outer race.

17. The equipment mounting assembly of claim 16, wherein the column includes a first through-hole axially underlying the bearing, a second through-hole axially overlying the bearing and an internal pathway within the column and extending between the first and second through-holes.

18. The equipment mounting assembly of claim 13, wherein the surveillance equipment is a first surveillance equipment, and wherein the second plate is configured to removably mount a second surveillance equipment thereto.

19. The equipment mounting assembly of claim 13, wherein the second plate is configured to mate with a base mounting plate of a second surveillance equipment, the second plate including a clamp configured to removably engage the base mounting plate of the second surveillance equipment in a tool-free manner, whereby the second surveillance equipment is coaxially mountable upon the assembly.

20. The equipment mounting assembly of claim 13, further comprising the surveillance equipment, wherein the surveillance equipment comprises at least one of a radar, a sensor, a camera, a flood light, a loud hailer, a microphone array, a laser, or another surveillance payload.

* * * * *